May 30, 1972  B. M. WERNER  3,666,383
POSITIVE DISPLACEMENT, GEAR TYPE PUMP
Filed July 29, 1970  3 Sheets-Sheet 1
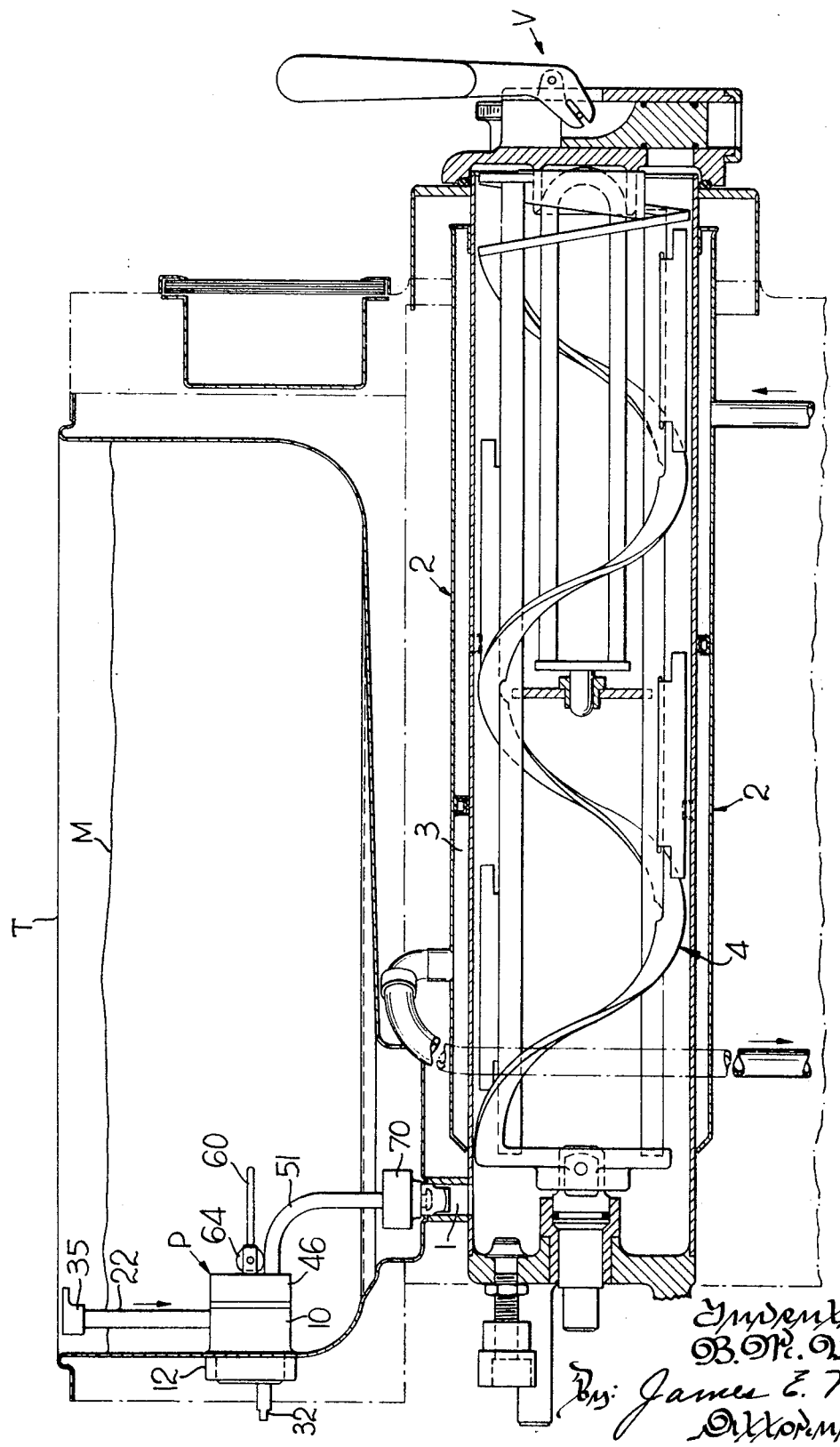

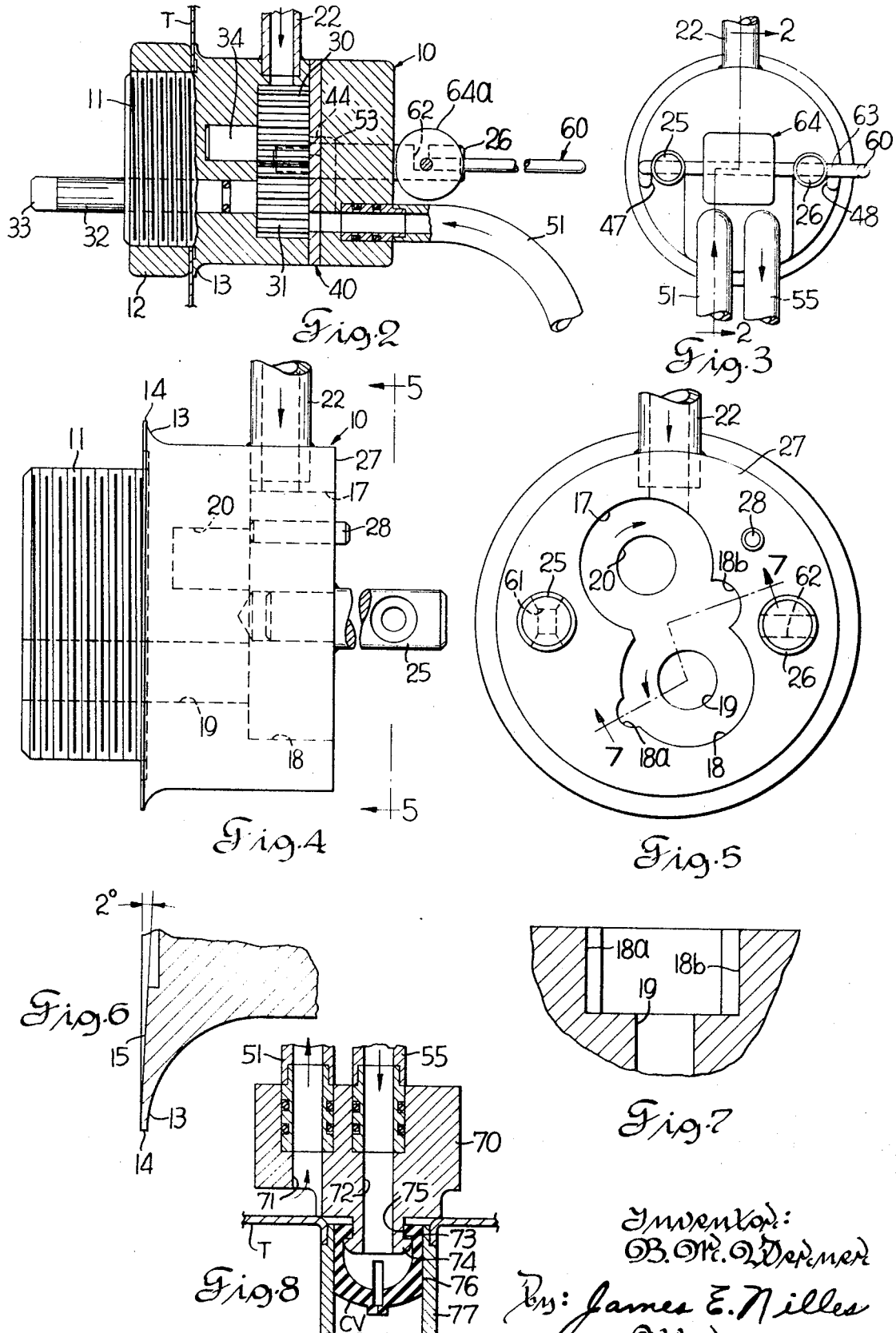

May 30, 1972   B. M. WERNER   3,666,383
POSITIVE DISPLACEMENT, GEAR TYPE PUMP
Filed July 29, 1970   3 Sheets-Sheet 3
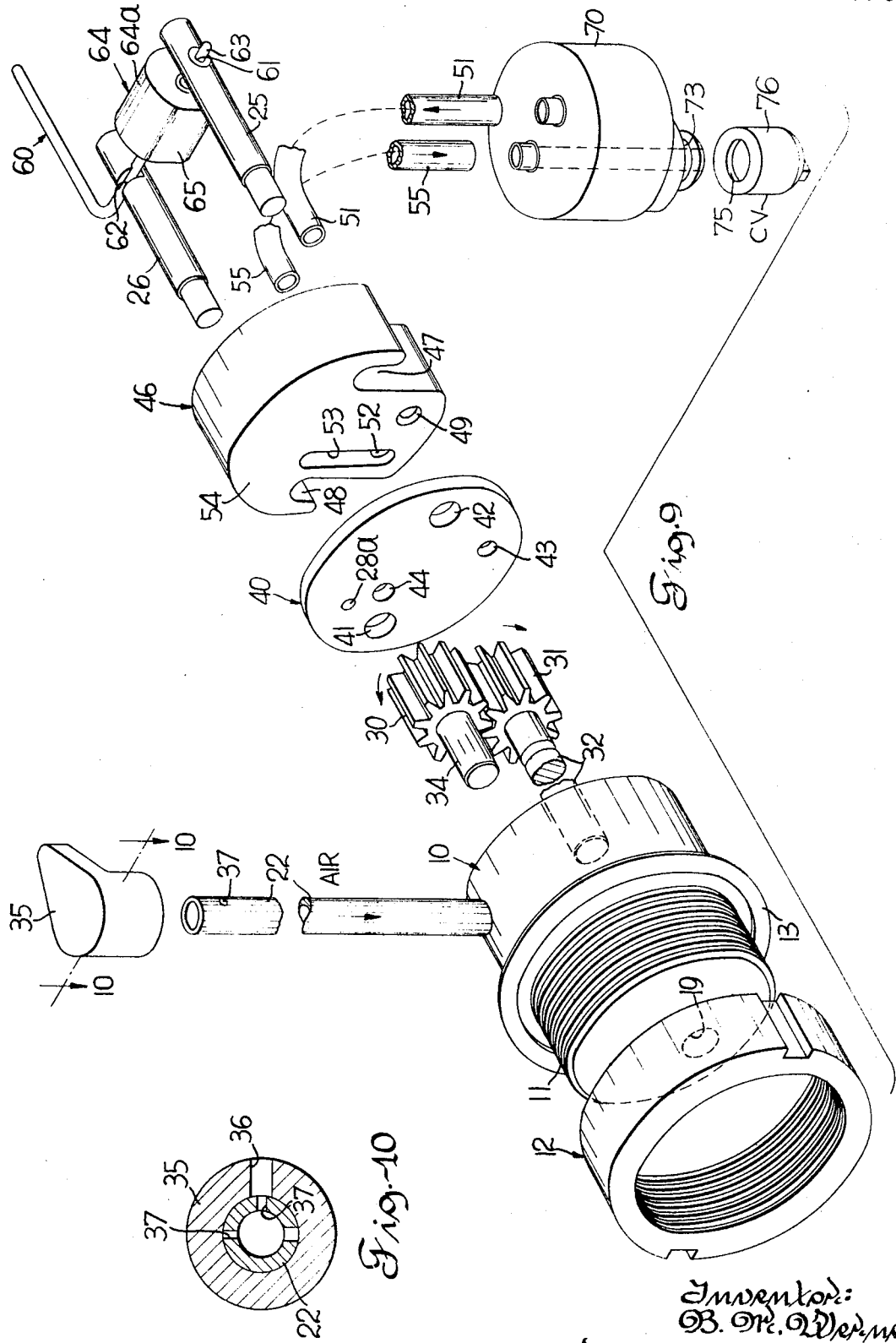

United States Patent Office 3,666,383
Patented May 30, 1972

3,666,383
POSITIVE DISPLACEMENT, GEAR TYPE PUMP
Bernfried M. Werner, Pompano Beach, Fla., assignor to Louis A. M. Phelan, Pompano Beach, Fla.
Filed July 29, 1970, Ser. No. 59,191
Int. Cl. F01c 1/08, 1/18, 21/00
U.S. Cl. 418—15
14 Claims

ABSTRACT OF THE DISCLOSURE

A positive displacement, gear type pump having a pair of gears in constant mesh for mixing and feeding air and a confection mix prior to delivery into a freezing cylinder. The pump operates at a relatively high speed so as to thoroughly mix the air and confection mix and provide a highly aerated mix to be frozen. The entire pump can be quickly and easily assembled and disassembled for frequent cleaning. The pump assembly can be easily mounted in the mix tank and is self-sealing with the wall thereof. The ratio of the air to the confection mix can be readily adjusted by adjusting the amount of air taken into the pump.

BACKGROUND OF THE INVENTION

The invention pertains generally to a positive displacement pump having two gears in constant mesh with one another for receiving air and fresh mix, mixing it thoroughly and then delivering it to the freezing cylinder.

An example of the prior art type of pump of this general character is shown in the U.S. patent to Cadman, No. 3,479,957, issued Nov. 25, 1969, and entitled "Positive Displacement Gear Type Pump." The pump of that prior art patent as did many others, were incapable of sufficiently aerating the air and fresh mix, and therefore a special aerating apparatus was required after the material left the pump and prior to its entry into the freezing chamber.

SUMMARY OF THE PRESENT INVENTION

The present invention provides a positive displacement gear type pump for mixing air and fresh mix into a thoroughly assembled product and then delivering the product to the freezing cylinder of a ice cream freezer or the like. The invention further contemplates a pump assembly which is easily disassembled by the expedient of simply swinging a lever so as to permit complete disassembly of all of the parts for ready cleaning.

Another aspect of the invention relates to a pump assembly having a pump body with a deformable flange which can be drawn up tightly against the mix tank for sealing therewith and without the need for special gaskets or the like.

A more specific aspect of the invention relates to the means for adjusting the air intake of the pump to thereby in turn, vary the degree of product over-run.

These and other objects and advantages of the present invention will appear hereinafter as this disclosure progresses, reference being made to the accompanying drawings.

BRIEF DESCRIPTION OF THE DRAWINGS

FIG. 1 is a cross sectional view through a continuous freezer embodying the pump made in accordance with the present invention;

FIG. 2 is a cross sectional view through the pump shown in FIG. 1, but on an enlarged scale;

FIG. 3 is an end elevational view of the pump shown in FIG. 2;

FIG. 4 is a side view of the pump body as shown in FIG. 2, but on an enlarged scale;

FIG. 5 is an end elevational view of the pump body as shown in FIG. 4;

FIG. 6 is an enlarged, fragmentary view of a corner of the pump body as shown in FIGS. 2 and 4;

FIG. 7 is a sectional view taken along line 7—7 in FIG. 5;

FIG. 8 is a cross sectional view taken generally along line 8—8 in FIG. 1;

FIG. 9 is a perspective, exploded view of the pump and its associated parts;

FIG. 10 is a cross sectional view along line 10—10 in FIG. 9.

DESCRIPTION OF THE PREFERRED EMBODIMENT

The pump P provided by the present invention finds particular utility in furnishing an aerated mix to a freezing cylinder. To do this, the pump must thoroughly mix air and fresh mix to provide the degree of over-run desired in the finished product. Furthermore, this pump must be capable of being completely disassembled so as to be thoroughly cleaned in accordance with health and sanitation requirements.

As shown in FIG. 1, the pump is mounted on a fresh mix tank T which in turn is mounted above a freezing cylinder 2. The tank T holds a quantity of confection mix M and has an outlet 1 in its bottom wall through which the aerated product is delivered to the rear end of the freezing cylinder 2. The freezing cylinder 2 is refrigerated by means of the annular refrigeration chamber 3 and a rotary scraper assembly 4 is rotatably mounted in the cylinder for forcing the product from the rear end of the chamber toward the front end of the freezing chamber where it is ultimately drawn off by the draw off valve V.

If a more complete description of the construction and function of the draw off valve is deemed to be either necessary or desirable, reference may be had to the co-pending United States application, Ser. No. 59,100, filed July 29, 1970, and entitled Freezer Door and Draw Off Valve for a Continuous Freezer.

If a more complete description of the scraper assembly is deemed to be either necessary or desirable, reference may be had to the co-pending United States application Ser. No. 59,099, filed July 29, 1970, and entitled, Scraper Assembly and Material Retarder for a Cylindrical Continuous Freezer, issued as Pat. No. 3,641,783 on Feb. 15, 1972.

Referring now in greater detail to the pump, it includes a pump body 10 which has a threaded portion 11 which is adapted to extend to the tank wall and be engaged by an internally threaded locking ring 12. The pump body has a radially extending flange 13, which as shown in FIG. 6, tapers to an outer, thin edge 14. The rear face 15 of the flange 14 is tapered inwardly so that when the lock ring 13 is drawn up tightly, the outer, thin edge 14 of the flange is tightly drawn against the inner wall of the tank thereby effecting a fluid tight seal. As indicated in FIG. 6, the degree of taper for the rear face of the flange is on the order of two degrees, although this amount may vary somewhat.

The pump body has a pair of bores 17 and 18 arranged in over-lapping or merging relationship as clearly shown in FIG. 5. A concentric bore 19 is formed with bore 18 and extends to the other side of the valve body. A bore 20 is formed concentric with bore 17. An air inlet conduit 22 extends downwardly into the pump body and is in communication with the bore 17, more particularly with the chamber formed between bore 17 and its gear 30.

The pump body has a pair of spaced, paralleled posts 25 and 26 brazed thereto and extending outwardly from the finally finished face 27 of the pump body. A locating pin 28 extends from the body.

As shown in FIGS. 2 and 9, a pair of gears 30 and 31 are provided for bores 17 and 18, respectively and are adapted to rotate in those bores so as to convey fluid between the teeth of the gears and the internal diameter of the bore. These gears are of the constant mesh type and the outer edge of the gears form a sliding fit with their respective bores. It will be noted that the lower gear 31 has a shaft 32 formed integrally therewith and which extends through the concentric bore 19 and outwardly of the pump body and tank. The freely extending end 33 (FIGS. 1 and 2) is adapted to be driven from a power source, not shown. The gear 30 on the other hand has a stub shaft 34 which is rotatably mounted in the concentric bore 20. In this manner, the gears are positively driven in the direction shown by the curvilinear arrows in FIG. 5.

Air is introduced into the pump via conduit 22, the upper end of which extends above the level of the mix in the tank. The upper end of the air conduit 22 has an adjustable cap 35 mounted thereon and which has a hole 36 that can be alignable with any number of different sized holes 37 in conduit 22. Thus the amount of air introduced can be varied so as to provide the amount of over-run which will be referred to later.

For the purpose of sealing the gears and their respective pumping chambers, a gasket plate 40 is mounted tightly against the finished surface 27 of the pump body. This plate has a pair of holes 41 and 42 extending therethrough for receiving the mounting posts 25 and 26. The plate also has a fresh mix intake hole 43 and a product discharge hole 44 extending therethrough. A pump cover 46 mounts against the gasket plate 40 and has a pair of open ended slots 47 and 48 through which the posts 25 and 26 extend. A locating hole 28a receives locating pin 28 on the pump body 10. It will be seen that when the assembly is loosened, the pump cover 46 can be simply lifted upwardly and off the posts. The cover has a hole 49 extending therethrough, which is alignable with hole 43 in the gasket plate and through which the fresh mix can be drawn up into the pump via the tube 51. The hole 41 in the gasket plate is aligned with the upper end of a generally vertical elongated slot 53 formed in the inner surface 54 of the pump body. A hole 52 places the slot 53 in communication with a tube 55 so that the finished product is delivered from the pump to the tank T.

Referring again to posts 25 and 26, it will be noted that their outer ends are adapted to receive a swingable lever 60. More specifically, post 25 has an aperture 61 extending therethrough while post 26 has an open ended L-shaped slot 62. The cross bar 63 of the lever 60 has a cam 64 fixed therewith, which cam has a locking surface 64a that is adapted to be swung into tight engagement with the outer side of the cover 46 when the lever 60 is in the upper position. Under those circumstances, the pump is locked together in tight sealing relationship. When the lever is swung to the generally horizontal direction as shown in FIG. 2, the flat or lower surface 65 of the cam acts to free the pump cover which can then be lifted off of the posts. The remainder of the pump can then be readily disassembled for cleaning, inspection or repair.

The lower end of tube 51 is adapted to sealingly be engaged in a tube receiving body 70 which has a passage 71 that places the tube 51 in communication with the inside of the tank so that fresh mix may be drawn up through the tube 51. The other tube 55 is also sealingly engageable in the tube receiving body 70 and a passage 72 places tube 55 in communication with the interior of the freezing chamber. The lower portion of member 70 has an annular groove 73 which defines a lower flange 74. A check valve CV fabricated from rubber or other flexible material has complementary shaped flange 75 which is adapted to sealingly seat in the groove 73 and the external surface 76 of the check valve is inserted in the conduit 77 forming a communication between the tank T and the freezing cylinder 2, thereby sealing it. The check valve is of the one-way type which permits flow of aerated product into the freezing cylinder but then closes to prevent return of the product or air in an outward direction of the cylinder.

RÉSUMÉ

The positive displacement gear type pump provided by the present invention is operated at a relatively high speed, for example at 3200 r.p.m. and acts to draw air and fresh mix into the pumping chambers formed between its gears and their respective bores. The travel of the air and fresh mix in the pumping chambers is short, and as shown in FIG. 5, the fresh mix enters the pumping chamber at the counter bore 18a adjacent bore 18, while the air enters chamber 17 generally adjacent the top side thereof. As the gears rotate, the product is thoroughly aerated and mixed and then discharged at the area indicated by counter-bore 18b in FIG. 5, out hole 41, through slot 53, hole 52 and tube 55. The need for separate aerating devices has thus been eliminated in the continuous freezer.

The pump can be quickly disassembled by simply swinging the lever 60 so that the cam takes the pressure off the pump assembly. The degree of over-run of the product can be easily varied by adjusting the cap 35 at the top end of the air intake tube.

The pump assembly can be readily sealed against the tank by simply tightening the locking ring 12 thereby forcing the flange 14 of the pump body tightly against the interior of the tank.

I claim:

1. A positive displacement, gear type pump for being sealingly mounted against a wall and comprising, a body defining a pair of bores arranged in side by side and merging relationship, a gear in each of said bores and having teeth in constant mesh, an air inlet in said body and in communication with the gear teeth of one gear, a fresh mix inlet in said body in communication with the gear teeth of the other gear, a common outlet in said body and in communication with the teeth of both gears for receiving and discharging the fluid conveyed by said gears, said common outlet being located at the pressure side of the junction of said gear teeth, a radially extending and relatively thin flange formed on said body for sealing engagement with said wall, said flange being tapered to a thin edge, and means engageable with the pump body and located on said wall at the side opposite of said flange and for drawing said thin edge of said flange tightly against said wall for sealing engagement therewith.

2. A pump as set forth in claim 1 including an air supply conduit in communication with one of said bores and extending from said pump body, and an adjustable cap on the upper end of said conduit and having means for varying the amount of air taken in by said conduit to thereby vary the degree of over-run of the product made by said pump.

3. The pump as set forth in claim 1 including a pump cover, and quick releasable cam means for releasably holding said cover in assembled relationship with said pump body.

4. A pump as set forth in claim 3 including a pair of posts extending from said body, said cam means including a cam mounted on said posts and swingable between pump release and pump assembled positions, and said cover is located between said body and said cam means and is removably mounted on said posts.

5. A positive displacement, gear type pump for being sealingly mounted against a wall and comprising, a body defining a pair of bores arranged in side by side and merging relationship, said body having a radially extending and relatively thin flange formed integrally therewith and tapering outwardly to a thin edge for sealing engagement with said wall, a gear in each of said bores and having teeth in constant mesh, an air inlet in said body and in communication with the gear teeth of one gear, a fresh mix inlet in said body in communication with the gear teeth of the other gear, a common outlet in said body and in communication with the teeth of both gears for receiving and discharging the fluid conveyed by said gears, said common outlet being located at the pressure side of the junction of said gear teeth, a quick removable cover for said body, and quick releasable cam means for releasably holding said cover in assembled relationship with said pump body.

6. A pump as set forth in claim 5 including an air supply conduit in communication with one of said bores and extending upwardly from said pump body, and an adjustable cap on the upper end of said conduit and having means for varying the amount of air taken in by said conduit to thereby vary the degree of over-run of the product made by said pump.

7. A pump as set forth in claim 5 including a pair of posts fixed at one end in and extending from said body, said cam means including a cam mounted on and between said posts and swingable between pump release and pump assembled positions, and said cover is located between said body and said cam means and is removably mounted on said posts.

8. A pump as set forth in claim 7 including an air supply conduit in communication with one of said bores and extending upwardly from said pump body, and an adjustable cap on the upper end of said conduit and having means for varying the amount of air taken in by said conduit to thereby vary the degree of over-run of the product made by said pump.

9. In combination with a continuous freezer having a freezing cylinder and a fresh mix tank located above said cylinder, a positive displacement, gear type pump comprising, a body defining a pair of bores arranged in side by side and merging relationship, a gear in each of said bores and having teeth in constant mesh, an air inlet in said body and in communication with the gear teeth of one gear, a fresh mix inlet in said body in communication with the gear teeth of the other gear, mix conduit means placing said tank in communication with said mix inlet, a common outlet in said body and in communication with the teeth of both gears, said common outlet being located at the pressure side of the junction of said gear teeth, a finished product conduit for receiving the product conveyed and mixed by said gears and conveying said product to said cylinder, a radially extending and relatively thin flange formed on said body for sealing engagement with a wall of said tank, said flange tapering radially outwardly to a thin edge, and means engageable with the pump body and located on said tank wall at the side opposite to said flange and for drawing said flange edge tightly against said wall for sealing engagement therewith.

10. A pump as set forth in claim 9 including an air supply conduit in communication with one of said bores and extending upwardly from said pump body, and an adjustable cap on the upper end of said conduit and having means for varying the amount of air admitted to said conduit to thereby vary the degree of over-run of the product made by said pump.

11. The pump as set forth in claim 9 including a pump cover, and quick releasable cam means for releasably holding said cover in assembled relationship with said pump body.

12. A pump as set forth in claim 11 including an air supply conduit in communication with one of said bores and extending upwardly from said pump body, and an adjustable cap on the upper end of said conduit and having means for varying the amount of air admitted to said conduit to thereby vary the degree of over-run of the product made by said pump.

13. A pump as set forth in claim 11 including a pair of posts extending from said body, said cam means including a cam mounted on said posts and swingable between a pump release and pump assembled position, and said cover is located between said body and said cam means and is removably mounted on said posts.

14. A pump as set forth in claim 13 including an air supply conduit in communication with one of said bores and extending upwardly from said pump body, and an adjustable cap on the upper end of said conduit and having means for varying the amount of air admitted to said conduit to thereby vary the degree of over-run of the product made by said pump.

References Cited

UNITED STATES PATENTS

| | | | |
|---|---|---|---|
| 3,018,641 | 1/1962 | Carpigiani | 418—206 |
| 3,390,638 | 7/1968 | Adams | 418—15 |
| 2,944,487 | 7/1960 | Walsh | 418—15 |
| 3,038,414 | 6/1962 | Margus | 418—70 |
| 1,042,951 | 10/1912 | Nielsen | 418—70 |
| 2,488,784 | 11/1949 | Van Heeckeren | 418—15 |
| 2,412,487 | 10/1946 | Amley et al. | 285—405 |
| 3,096,720 | 7/1963 | Younger | 418—149 |

ARTHUR I. McKOEN, Primary Examiner

J. J. VRABLIK, Assistant Examiner

U.S. Cl. X.R.

418—70, 134, 206; 285—405